United States Patent
Williams

(10) Patent No.: US 9,442,185 B2
(45) Date of Patent: *Sep. 13, 2016

(54) NON-CONTACTING ELECTRO-MAGNETIC SPHERICAL PLANAR MOTOR PROVIDING 3-AXIS CONTROL OF A BALL JOINT GIMBAL MOUNTED ELECTRO-OPTIC SYSTEM

(71) Applicant: Raytheon Company, Waltham, MA (US)

(72) Inventor: Darin S. Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 252 days.

This patent is subject to a terminal disclaimer.

(21) Appl. No.: 14/267,302

(22) Filed: May 1, 2014

(65) Prior Publication Data

US 2015/0316376 A1 Nov. 5, 2015

(51) Int. Cl.
*G06K 19/06* (2006.01)
*G01S 7/481* (2006.01)
*G01C 19/48* (2006.01)

(52) U.S. Cl.
CPC .............. *G01S 7/4817* (2013.01); *G01C 19/48* (2013.01); *Y10T 74/1264* (2015.01)

(58) Field of Classification Search
CPC ... G02B 7/1821; G06K 7/10732; G06K 7/14
USPC ...... 359/841, 843; 244/3.1, 3.15, 3.16, 3.17; 235/454, 462.43, 494
See application file for complete search history.

(56) References Cited

U.S. PATENT DOCUMENTS

| | | | |
|---|---|---|---|
| 3,376,578 A | | 4/1968 | Sawyer |
| 3,998,105 A | * | 12/1976 | Flusche .................. G01C 19/42 73/504.11 |
| 4,009,393 A | * | 2/1977 | Ashley, Jr. ............ F41G 7/2213 235/411 |
| 4,076,344 A | | 2/1978 | Gaines et al. |
| 4,123,134 A | * | 10/1978 | Meyers ................. F41G 7/2213 244/3.16 |
| 4,329,579 A | * | 5/1982 | Jansen .................. F41G 7/2213 250/203.1 |

(Continued)

OTHER PUBLICATIONS

Anders et al., "A Novel Spherical Linear PM Motor for Direct Driving Infrared Optical Telescope," IEEE, 1999, pp. 528-530.

(Continued)

*Primary Examiner* — Daniel St Cyr
(74) *Attorney, Agent, or Firm* — Eric A. Gifford

(57) ABSTRACT

A ball gimbal electro-optic system comprises a ball gimbal mounted on a platform. The gimbal includes a socket mounted on the platform and an inner ball captured within the socket and free to rotate about combinations of three orthogonal axes to point a pointing axis. A directional electro-optic element is mounted within the inner ball to transmit or receive an optical beam along the pointing axis. A spherical planar motor comprises a plurality of two-dimensional drive elements configured to apply non-contacting electro-magnetic forces in planes tangential to the inner ball at at least two control points on different diameters of the inner ball in commanded two-dimensional directions within the tangential planes to rotate the inner ball within the socket to point the pointing axis. In different embodiments, the spherical planar motor may be configured as a spherical planar DC motor or a spherical planar induction motor. Other systems such as power, ball position readout and data I/O may also be configured as "non-contacting" systems to maintain the inertial stabilization of the inner ball.

16 Claims, 13 Drawing Sheets

(56) References Cited

U.S. PATENT DOCUMENTS

| | | | |
|---|---|---|---|
| 4,879,460 A * | 11/1989 | Schleimann-Jensen | F41G 7/2213 |
| | | | 250/216 |
| 5,011,320 A | 4/1991 | Love et al. | |
| 5,012,367 A | 4/1991 | Toensing | |
| 5,538,205 A * | 7/1996 | Bitson | F41G 7/008 |
| | | | 244/3.16 |
| 6,326,759 B1 | 12/2001 | Koerner et al. | |
| 6,396,233 B1 * | 5/2002 | Christison | G05B 5/01 |
| | | | 244/3.16 |
| 6,820,846 B2 | 11/2004 | Knoski | |
| 7,032,469 B2 | 4/2006 | Bailey | |
| 7,175,095 B2 | 2/2007 | Pettersson et al. | |
| 7,290,719 B2 | 11/2007 | Ladas et al. | |
| 7,388,700 B1 | 6/2008 | Odhner | |
| 8,047,739 B2 | 11/2011 | Sellers et al. | |
| 8,334,490 B2 * | 12/2012 | Schaub | F41G 7/224 |
| | | | 244/3.16 |

OTHER PUBLICATIONS

John J. Stickler, "A Study of Single-Sided Linear Induction Motor Performance with Solid Iron Secondaries," IEEE Transactions on Vehicular Technology, vol. VT-31, No. 2, May 1982, pp. 107-112.
Hoshina et al., "Development of Spherical Ultrasonic Motor as a Camera Actuator for Pipe Inspection Robot," The 2009 IEEE/RSJ International Conference on Intelligent Robots and Systems, Oct. 11-15, 2009, pp. 2379-2384.

* cited by examiner

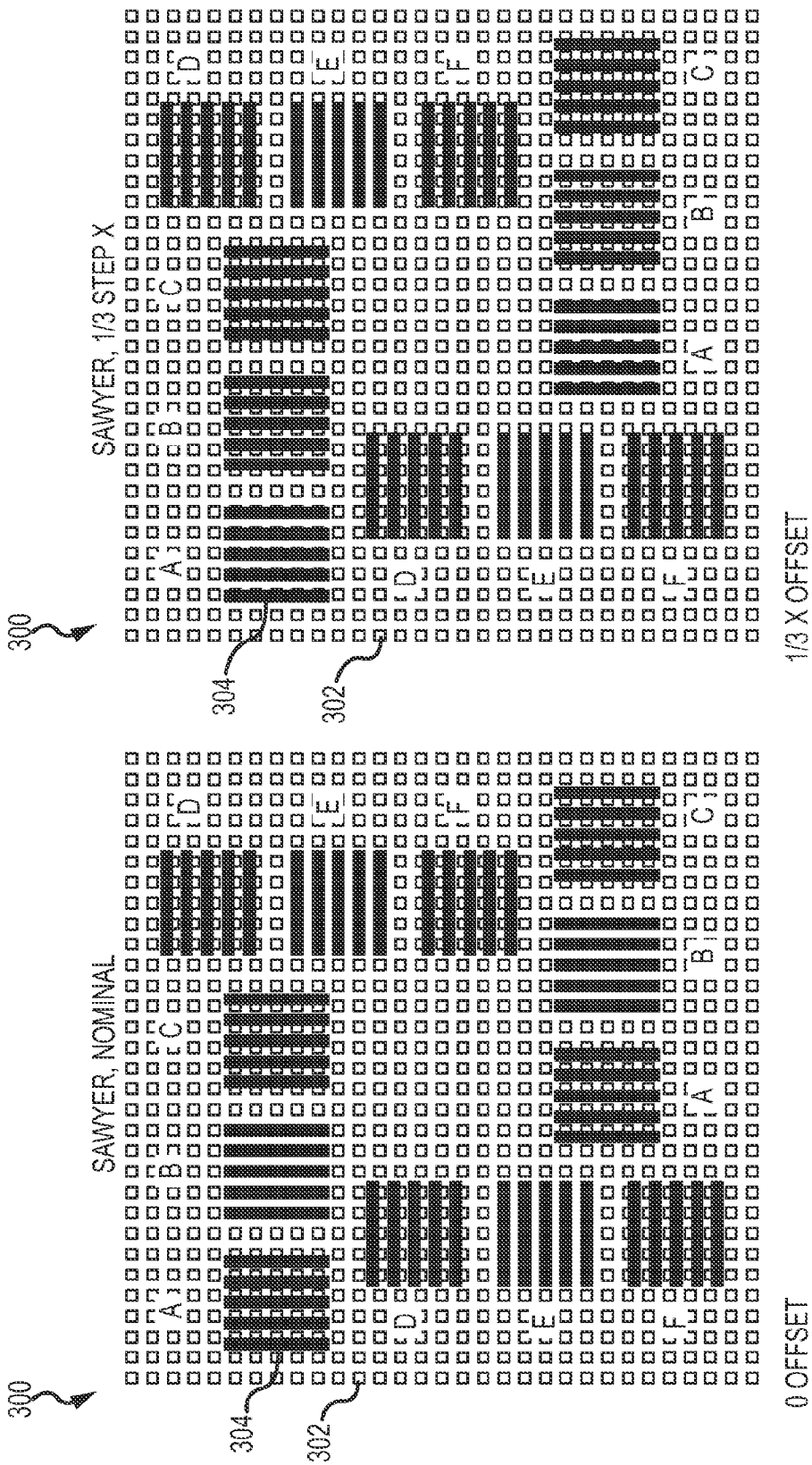

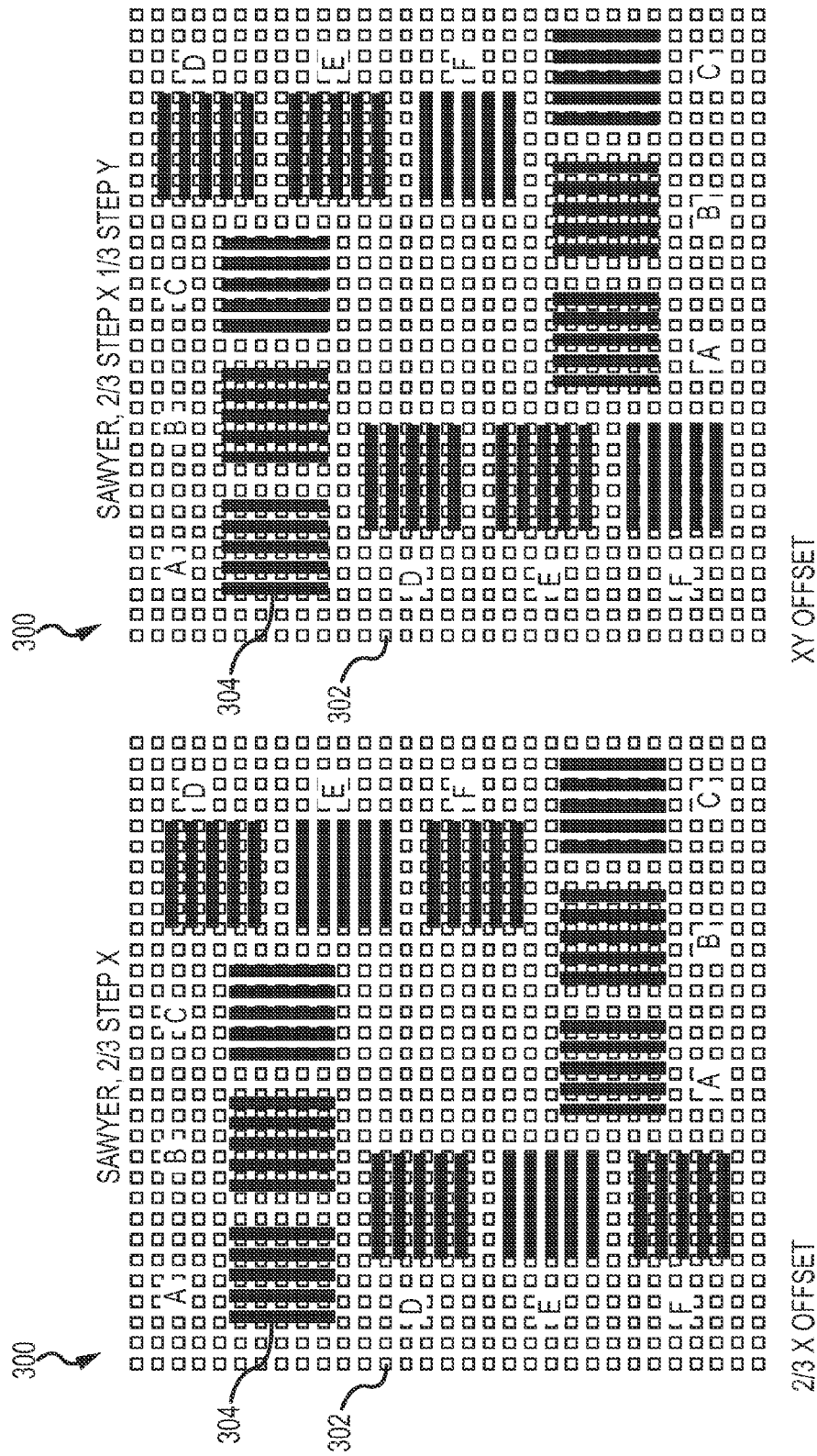

40 DEG CROSS AXIS
WITH 1 TOOTH/DEG

NON-CONTACTING ELECTRO-MAGNETIC SPHERICAL PLANAR MOTOR PROVIDING 3-AXIS CONTROL OF A BALL JOINT GIMBAL MOUNTED ELECTRO-OPTIC SYSTEM

RELATED APPLICATIONS

This application is related to co-pending U.S. patent application entitled "Ball Joint Gimbal Imaging System with an Off-Gimbal Directional Electro-Optic Component."

BACKGROUND OF THE INVENTION

1. Field of the Invention

This invention relates to ball joint gimbal mounted electro-optic (EO) systems, and more particularly to the use of two-dimensional non-contacting electro-magnetic (EM) forces for providing full three-axis steering control.

2. Description of the Related Art

An EO system includes a directional EO element such as a detector or laser source and a gimbal for pointing the directional EO element. Optics are mounted on the gimbal to receive (detector) or transmit (source) an optical beam to or from the EO element. The optics define a field-of-view (FOV) for the EO element about the pointing axis. The gimbal slews the pointing axis, and FOV, in two axes over a larger field-of-regard (FOR). This type of EO system may be used, for example, on aircraft or various types of munitions e.g. missiles, rockets, artillery shells, etc.

As shown in FIG. 1a, the classic method to control two-axis pointing of pointing axis 8 is to control (and measure) rotation separately in each of two axes (Az/El or Yaw/Pitch) through a nested gimbal arrangement 10 in which a first gimbal 12 is mounted on a second gimbal 14. The axes of rotation 16 and 17 of the first and second gimbals are perpendicular to each other such that each axis of the nested gimbal controls one axis of rotation. Gimbal drive motors are configured to mechanically rotate each gimbal about its axis. With a two axis system, the third rotational axis is kinematically constrained by the position of the first two gimbals. For example, a particular Az, El or yaw/pitch angle pair rigidly specifies a unique roll angle. Roll cannot be independently controlled without adding a third gimbal or some equivalent.

As shown in FIG. 1b, another approach uses a ball gimbal joint 20 that includes an inner ball 22 captured within a socket (not shown). A pair of ultrasonic drive motors 26, 28 are placed in direct contact with inner ball 22 to apply rotational forces 30, 32 about contact points along orthogonal axes (e.g. Az and El) to control two-axis pointing of pointing axis 34. The third rotational axis (e.g. roll) is driven implicitly via control of the first two axes. Unlike with nested gimbals, the third axis is not rigidly constrained and can drift over repeated positioning. A third ultrasonic drive motor may be placed in direct contact with inner ball 22 to provide a third control axis. Each ultrasonic drive motor creates torque by causing a traveling wave in annual metallic elastic body to which piezoelectric elements are glued. This wave is created as each point on the annulus to moves in a small ellipse, back and forth along the circumference of the annulus, and up and down along its axis. The direction and speed of the traveling wave is determined by the phase differences of this motion at points along the circumference. At the bottom of each elliptical cycle, different points along the annulus contact the ball and push it circumferentially about the annulus, like twisting a bottle cap. See Masahiko Hoshina et al "Development of Spherical Ultrasonic Motor as a Camera Actuator for Pipe Inspection Robot" The 2009 IEEE/RSJ International Conference on Intelligent Robots and Systems, Oct. 11-15, 2009 St. Louis, USA.

As shown in FIG. 1c, another approach modeled after the human eye uses multiple tendons 40 attached to the surface of the inner ball 42 of a ball joint gimbal. Rather than applying a rotational force about a contact point, as in the first two approaches, this type of controller applies tangential forces along the surface of the ball at each contact point. Tendons can only pull, specifically in the direction of the tendon. Multiple tendons must act together to provide rotation in an arbitrary direction, or even back and forth motion in the same axis (opposing directions). Three tendons can provide full two-axis control, although four are typically used. Similar to the nested gimbal, the third rotational axis is kinematically constrained by these tendons, just not as rigidly (because roll motion is largely perpendicular to the tendon axes). Examples of this approach are provided in U.S. Pat. Nos. 6,326,759 and 7,032,469.

As shown in FIG. 1d, another approach uses linear electro-magnetic permanent magnet (PM) motor technology to apply tangential forces 50, 52 and 54 along predetermines axes to allow a telescope mounted on an inner ball 56 of a ball joint gimbal to be controlled in three dimensions simultaneously. In one example, rotation is realized by 24 single-axis motor segments (4 yaw, 4 pitch, and 8 roll), with pairs of segments symmetrically distributed around the central bearing unit to balance forces. Each of these segments is independent in the sense that the rotor portion of each segment must remain adjacent to its own stator coil through the range of motion. This implies that the motor pole pitch must be large enough to maintain this alignment over the range of motion, including cross-axis motion from the other motors. This limits the motion in this configuration to about +/−3 degrees. The motor is a permanent magnet excited by double sided linear motor segments. The double-sided motor configuration consumes considerable packaging volume, making it inappropriate for smaller systems. But, the SOFIA telescope includes a 2.5 m diameter primary mirror, with a ball joint gimbal large enough to accommodate the motor configuration. See M. Anders et al "A Novel Spherical Linear PM Motor for Direct Driving Infrared Optical Telescope" Institute of Electrical Energy Conversion, pp. 528-530, 1999.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides inertially stabilized full 3-axis steering control of a ball joint gimbal mounted EO element over an extended range of motion. This is accomplished by applying two-dimensional forces in controllable directions within planes tangential to the inner ball at at least two control points on different diameters of the inner ball. The spherical planar motor is inertially isolated from the inner ball, the only contact to the inner ball is via the ball joint gimbal's bearing structure. Active magnetic levitation may be used to eliminate even that contact. The spherical planar motor provides full 3-axis steering of the inner ball in which the ball may be independently rotated around any of the 3 axes or combinations thereof.

In an embodiment, a ball gimbal electro-optic system comprises a ball gimbal mounted on a platform. The gimbal includes a socket mounted on the platform and an inner ball captured within the socket and free to rotate about combinations of three orthogonal axes to point a pointing axis. A directional electro-optic element is mounted within the inner ball to transmit or receive an optical beam along the pointing axis. A spherical planar motor comprises a plurality of two-dimensional drive elements configured to apply non-contacting electro-magnetic forces in planes tangential to the inner ball at at least two control points on different diameters of the inner ball in commanded two-dimensional directions within the tangential planes to rotate the inner ball within the socket to point the pointing axis.

In different embodiments, the spherical planar motor may be configured as a spherical planar DC motor or a spherical planar induction motor.

In an embodiment of a spherical planar DC motor, the motor comprises one or more rotor elements formed in the surface of the inner ball. Each rotor element comprises a two-dimensional pattern of rotor teeth. The rotor teeth may be formed of a magnetic material or a permanent magnets. At least two two-dimensional drive elements are positioned adjacent to control points on different diameters of the inner ball. Each drive element comprises a two-dimensional array of controllable drive heads arranged substantially parallel to, but non-contacting, the adjacent portion of the inner ball and the two-dimensional pattern of rotor teeth. A position measurement device is configured to determine the rotational position of the inner ball, hence the placement of the rotor teeth relative to the drive heads. A processor is configured to determine from a pointing command and the rotational position of the ball the energization of the drive heads within each drive element that act upon the adjacent rotor teeth to produce commanded two-dimensional forces in planes tangent to the inner ball at the at least two control points to rotate the inner ball within the socket to point the pointing axis. A controller is configured to apply the determined energization to the drive heads to drive the inner ball to slew the pointing axis in accordance with the pointing command.

In an embodiment, each pairing of a drive element and rotor element forms a modified Sawyer motor, adapted for all axis motion and operating on the surface of a ball.

In an embodiment of the spherical planar DC motor, the same rotor element may be acted upon multiple drive elements. Or equivalently, at different rotational positions of the inner ball, different drive elements will apply two-dimensional forces to the same rotor element tooth. In this embodiment, the one or more rotor elements and one or more drive elements are configured such that the angular extent of the rotor element is greater than the angular spacing between control points.

In an embodiment of the spherical planar DC motor, the center-to-center spacing between drive heads in each drive element is less than the minimum center-to-center spacing between rotor teeth, and preferably less than one-half the spacing between rotor teeth, so that the commanded two-dimensional forces may be applied an arbitrary direction about each tooth without assuming a fixed tooth spacing.

In an embodiment of the spherical planar DC motor, wherein the mapping of the two-dimensional pattern of rotor teeth onto the spherical surface of the inner ball is non-uniform. In an embodiment, the rotor teeth are substantially circular to improve packing onto the spherical surface.

In an embodiment of the spherical planar DC motor, three two-dimensional drive elements are positioned at three corners of a cube circumscribed by a sphere.

In an embodiment, the EO system is inertially stabilized in that the only physical contact with the inner ball is via the gimbal's bearing. The spherical linear motor and all other control systems such as power, data I/O and ball position readout are all non-contacting. Power may be provided by either an on-gimbal battery or via inductive coupling to an off-gimbal power source. An input data path may be provided using off-gimbal optical transmitters with optical pick-ups on the inner ball. An output data path may be provided using modulated retro-reflectors on the inner ball with an illuminator and optical pick-ups off-gimbal or using wireless technology. Ball position readout may be provided by placing globally unique patterns (or locally unique patterns within a larger overall pattern so that each is unambiguous by context) at different points along the surface of the inner ball that are read by read heads positioned adjacent the ball.

In an embodiment, Vernier stabilization provides a limited about of line-of-sight adjustment for the EO component to keep it stable for small amounts of pointing jitter. In an embodiment, an on-ball inertial rotation sensor measures high-frequency jitter, and this signal is fed forward, moving the imaging detector to compensate. The offset (relative to the nominal camera line of sight) induced by this compensation is transmitted along with the picture data, so that the line of sight of the EO component relative to the platform may be accurately determined.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 6a-6d are diagrams depicting a known planar Sawyer motor and motion along two orthogonal axes;

DETAILED DESCRIPTION OF THE INVENTION

The present invention provides inertially stabilized full 3-axis steering control of a ball joint gimbal mounted EO element over an extended range of motion. This is accomplished by applying two-dimensional forces in controllable directions within planes tangential to the inner ball at at least two control points on different diameters of the inner ball.

The spherical planar motor is inertially isolated from the inner ball, the only contact to the inner ball is via the ball joint gimbal's bearing structure. Active magnetic levitation may be used to eliminate even that contact. The spherical planar motor provides full 3-axis steering of the inner ball in which the ball may be independently rotated around any of the 3 axes or combinations thereof.

In applications such as aircraft, missiles, surveillance it is important that the inner ball have an extended range of motion in at least two axes to control the pointing axis to slew the EO element's field of view (FOV) over a large field of regard (FOR). For example, for certain applications a range of motion of at least 10 degrees (e.g. +/−5 degrees), and preferably at least 20 degrees (e.g. +/−10 degrees), in pitch and yaw (or Az/EL) may be required. A full 360 degrees of continuous motion may be required in roll in order to either induce a roll component on a stable platform or to null a roll component on a rolling platform.

Figure 1A:
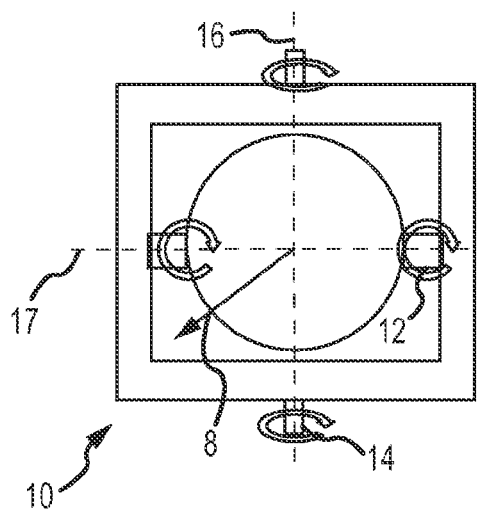
FIGS. 1a-1d as described above, illustrate different gimbal configurations.
Figure 1B:
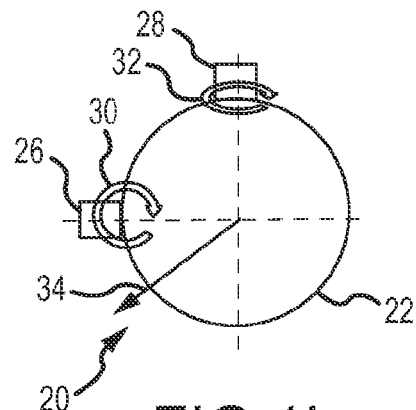
Figure 1C:
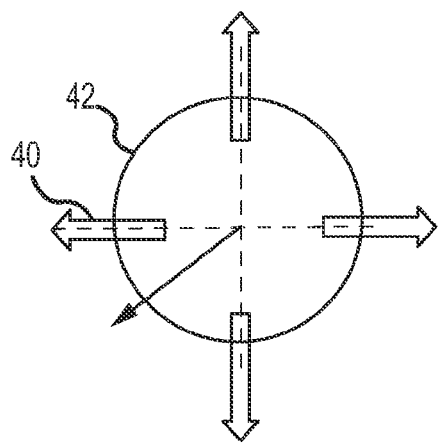
Figure 1D:
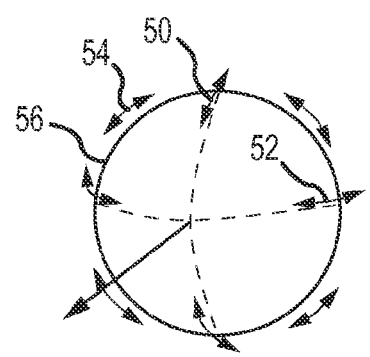
Figure 2:
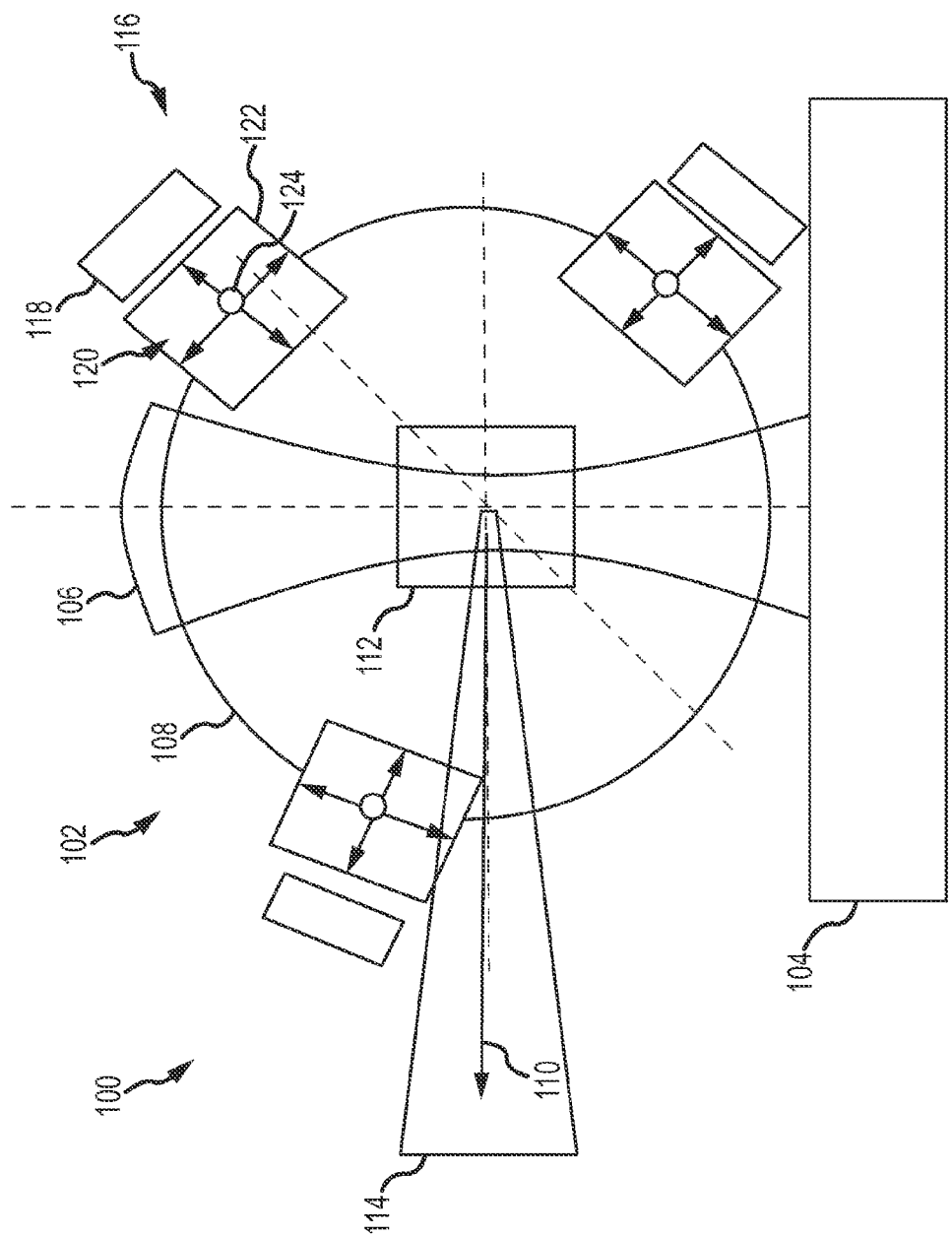
FIG. 2 is a diagram of an embodiment of a pointing control system for a ball joint gimbal configured to apply non-contacting EM forces in planes tangential to the inner ball to control pointing axis.

In an embodiment as shown in FIG. 2, a ball gimbal electro-optic system 100 comprises a ball gimbal 102 mounted on a platform 104. The gimbal includes a socket 106 mounted on the platform and an inner ball 108 captured within the socket and free to rotate about combinations of three orthogonal axes to point a pointing axis 110. A directional electro-optic element 112 is mounted within the inner ball to transmit or receive an optical beam 114 along the pointing axis. A spherical planar motor 116 comprises a plurality of two-dimensional drive elements 118 configured to apply two-dimensional non-contacting electro-magnetic forces 120 in planes 122 tangential to the inner ball at at least two control points 124 on different diameters of the inner ball, to rotate the inner ball within the socket to point the pointing axis. The direction of the EM forces 120 are arbitrary and controllable within tangential planes 122 by controlled energization of drive elements 118 e.g. active windings.

Spherical planar motor 116 may be configured as an induction motor in which the surface of the inner ball provides a passive conductor opposite the active windings. The drive elements induce two-dimensional eddy currents in the surface of the inner ball thus creating an opposing magnetic field to that created by activation of the drive elements.

Spherical planar motor 116 may be configured as a DC motor in which the surface of the inner ball is provided with a two-dimensional pattern of teeth formed of a magnetic material or permanent magnets. The drive elements create magnetic fields that apply forces to the adjacent rotor teeth in the desired direction. This is similar to a planar Sawyer motor described in U.S. Pat. No. 3,376,578 wrapped onto a spherical surface. Modifications must be made to the Sawyer motor design to accommodate the spherical shape. Such a modified Sawyer motor may be used to provide the two-dimensional forces at each control point.

Figure 3:
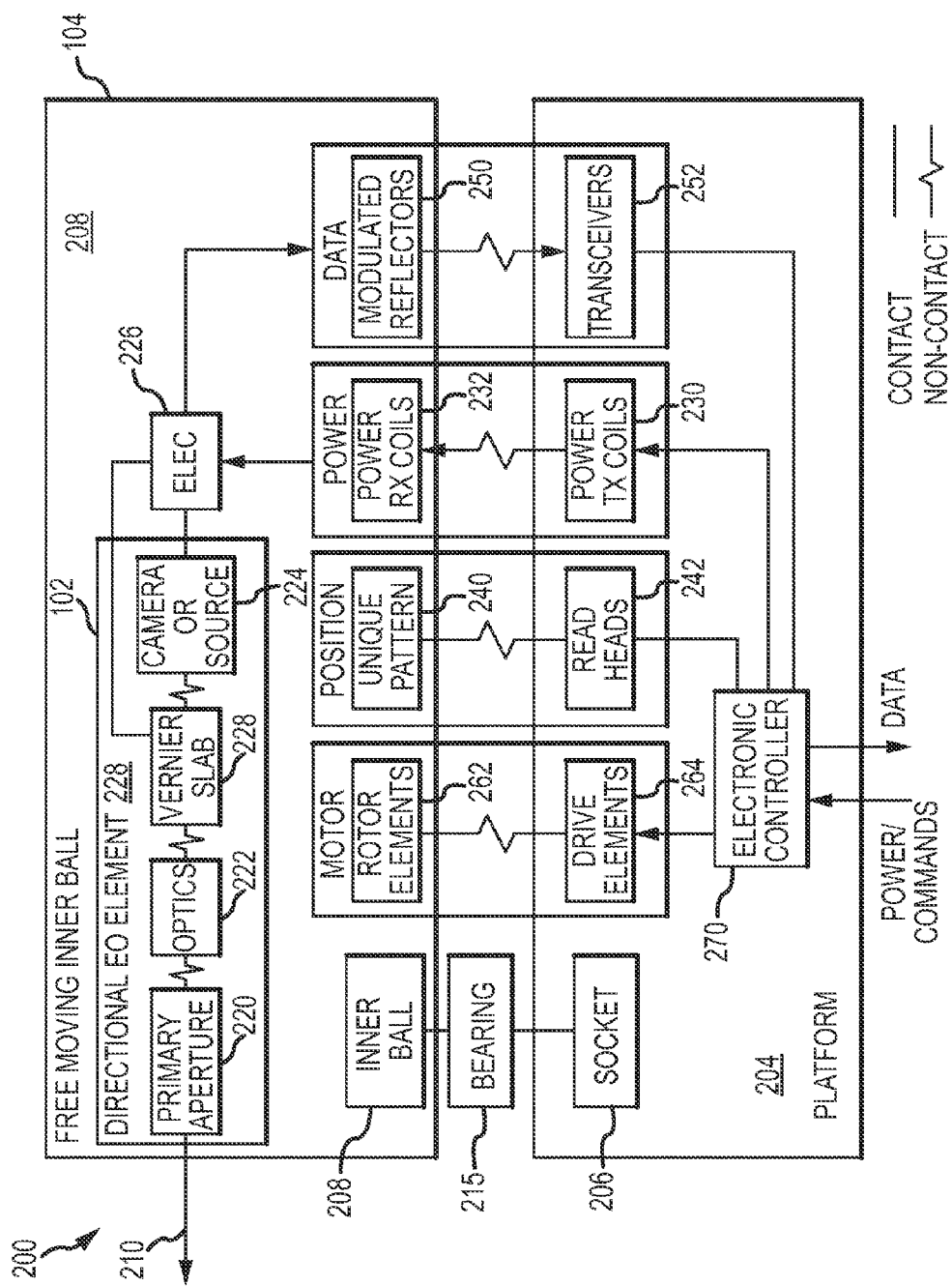
FIG. 3 is a block diagram of an embodiment of a ball joint gimbal mounted EO system.
Figure 4:
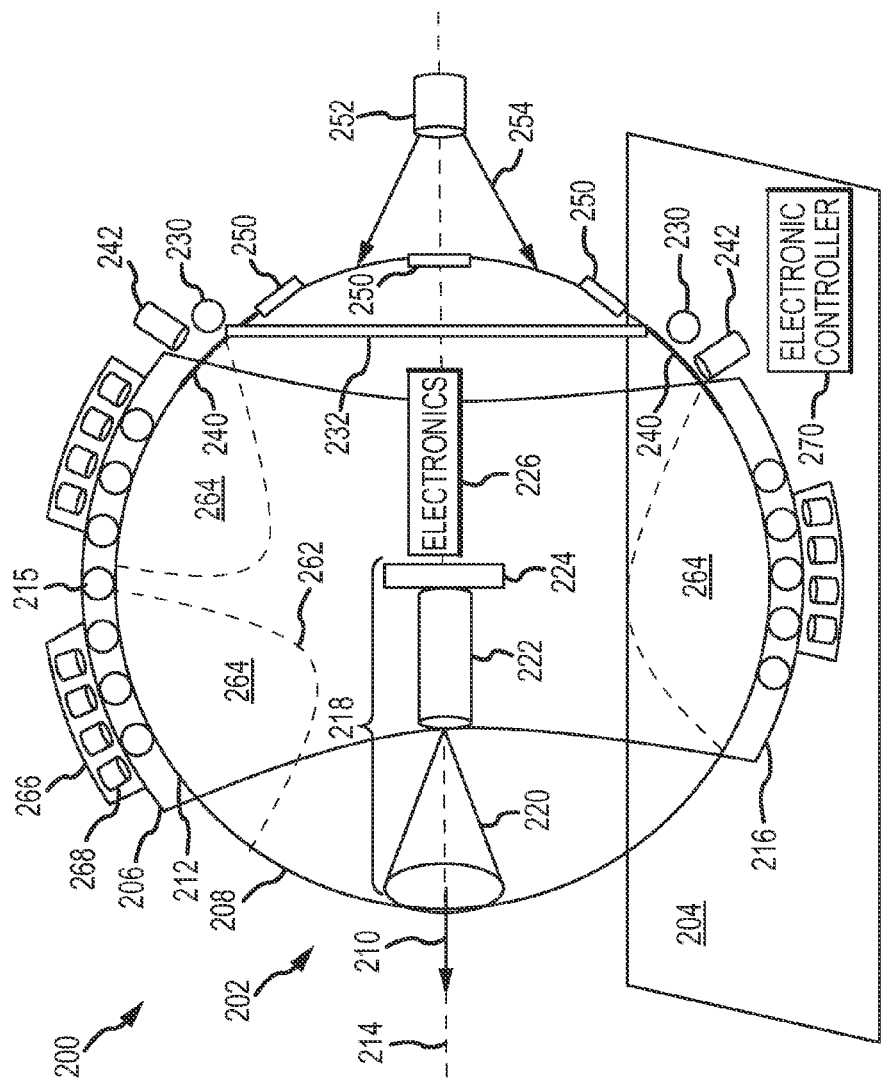
FIG. 4 is a side view of an embodiment of a ball joint gimbal mounted EO system.

As shown in FIGS. 3 and 4, an embodiment of a ball gimbal electro-optic system 200 is inertially stabilized in that the only mechanical contact, if any, with the inner ball from components off of the inner ball is through the ball gimbal bearing material. If the ball gimbal uses an air bearing or active magnetic levitation, there is no physical contact with the inner ball. Components mounted off-gimbal may be mounted either directly or indirectly on the platform to move with the platform. From a purely mechanical stand point, the ball is freely rotating in all axes, but fully constrained in position. The system may be configured to accommodate any desired range of motion needed in any or all of the three axes for a particular FOR.

Ball gimbal electro-optic system 200 comprises a ball gimbal 202 mounted on a platform 204 e.g. a missile body, aircraft, surveillance platform. The ball gimbal includes a socket 206 fixedly mounted on the platform and an inner ball 208 captured within the socket and free to rotate about combinations of three orthogonal axes to point a pointing axis 210.

In this embodiment, the outer surface of the ball comprises a bearing surface 212 configured as a partial sphere, where that partial sphere includes a full circumference of the sphere about an axis 214, and extends in both directions along that axis so that the shrinking ball diameter in the plane parallel to the circumference allows the ball to be constrained against both forward and backward motion along the axis. This bearing surface is held within socket 204 by a bearing 215. The socket 204 comprises one or more portions of a spherical surface 216 that extend forward and backward from the circumference to constrain the position (but not the rotation) of the inner ball 208 in all axes.

In this embodiment the inner ball 208 and socket 204 are single spherical segments (spheres with the top and bottom removed), and the bearing 215 comprises individual bearings. In an alternate embodiment the inner ball and socket are also spherical segments, and the bearing comprises rigid ball bearings held separated from each other by a cage (which tends to limit roll motion). When greater range of travel is required, the socket may consist of multiple discrete patches configured so that the ball bearings may recirculate from one side of a patch to the other as the inner ball moves.

A directional electro-optic element 218 is mounted within the inner ball 208 to transmit or receive an optical beam along the pointing axis 210. EO element 218 suitably includes a primary aperture 220, optics 222 and an EO component 224 such as a detector or a laser source. Electronics 226 to provide or receive data and/or control signals to and from EO component 224. The element transmits or receives the optical beam within a FOV about the pointing axis 210. The ball gimbal is rotated to move the pointing axis, hence FOV over a larger FOR as dictated by a particular application.

Additional benefits from relaxing the pointing stabilization requirements of the ball gimbal may be obtained without loss of system performance by adding Vernier stabilization 228 within the ball. This would provide a limited amount of line-of-sight adjustment for the EO component to keep it stable for small amounts of pointing jitter, reducing requirements on the ball-gimbal pointing system. In an embodiment, an on-ball inertial rotation sensor measures high-frequency jitter, and this signal is fed forward, moving the imaging detector to compensate. The offset (relative to the nominal camera line of sight) induced by this compensation is transmitted along with the picture data, so that the line of sight of the EO component relative to the platform may be accurately determined Alternative embodiments will be obvious to one of normal skill in the art. These include, without limitation, moving other elements within the optical train to stabilize the image, direct inertial stabilization of components (for example, via a small gyro), digital vs. optical stabilization, and so on.

Power is supplied to the inner ball 208 without physical connection (other than possibly a few wires) to the platform (possibly excluding a ground through the bearings). In an implementation, a power source such as a battery may be placed within the inner ball. The battery contacts the inner ball but does not create a physical connection between the platform or a component off of the inner ball, hence is "non-contacting". In other applications, power may be transferred into the ball via non-contact means. In the embodiment illustrated, power is transferred via electromagnetic induction, with transmitting coils 230 placed around (and spaced away from) the inner ball and receiving coils 232 placed on and around the rear of the inner ball. In some embodiments, multiple coils at different locations on the inner ball may be used to assure that at least one is receiving power at any given ball position. In alternative embodiments power may be supplied optically, or the ball may be powered by capturing energy from the vibration of the system.

Several options are available for directly reading the rotational position of the inner ball relative to the socket and platform. Bailey US20040089083 describes a method where globally unique patterns 240 at different points along the surface of the inner ball are read by read heads 242 positioned adjacent the ball. As necessary, additional patterns and read heads may be included to maintain all-axis visibility over the FOR Using foreknowledge of the placement of these patterns on the ball and of the read heads on the base, the rotational position of the ball relative to the platform may be calculated. This is an absolute, vs. incremental, encoding method in that knowledge of previous rotational positions of the ball are not necessary to unambiguously calculate the current position.

Incremental coding is another option. In a typical incremental encoder, absolute position is determined by moving until a reference mark is reached, and then relative position is determined from there. Absolute/incremental coding, as in U.S. Pat. No. 7,034,283 Williams, is a hybrid approach. It simplifies the sensors, allowing a smaller field-of-view where the observed portion of the pattern at any one time is not globally unique. But, but the pattern is configured so that a limited amount of motion (vs. returning all the way to a fixed reference), allows the absolute position to be determined from prior context. Alternate embodiments include induction coupling as in a resolver (using different frequencies for the two axis), feedback from the drive system as subsequently discussed, or may use a single optical sensor with a larger field of view to obtain roll.

When the EO component is a static source, such as a laser-pointer, it is not necessary to transfer data from the inner ball. When the EO element is a detector, provision must be made to transmit data from the inner ball to the rest of the system.

In some embodiments, data is relayed from the inner ball to components mounted to the platform. In an embodiment, the data is encoded onto modulated retro reflectors 250 along the back surface of the ball. Transceivers 252 on the platform illuminate the retro reflector, and co-located sensors receive and decode the modulated data. When the maximum range of gimbal travel is within the overlap between the acceptance angle of a single retro reflector and the operating angle 254 of a single transceiver 252, only one data source is required. When the range is larger, multiple retro reflectors 250 may be used, so that at least one is always in view. The same coded signal may be sent to all. Since these retro-reflectors consume nearly no power and are inexpensive, this may be less costly than other alternatives.

A variety of alternate embodiments will be obvious to one of normal skill in the art. For example, conventional wireless communication, such as 802.11.g, Bluetooth, or near-field wireless communication may be used. Or data may be modulated onto the resolver signal, providing dual-use for the coils.

In other embodiments, limited data is communicated up to the ball. The preferred embodiment for this functions is optical pickups on the ball (spaced as were the retro-reflectors), receiving a modulated source from the platform.

A spherical planar motor 260 is configured to provided non-contacting EM forces in controllable and arbitrary directions in planes tangent to the inner ball at at least two control points on different diameters of the inner ball to rotate the inner ball and point the pointing axis.

Figure 7A:
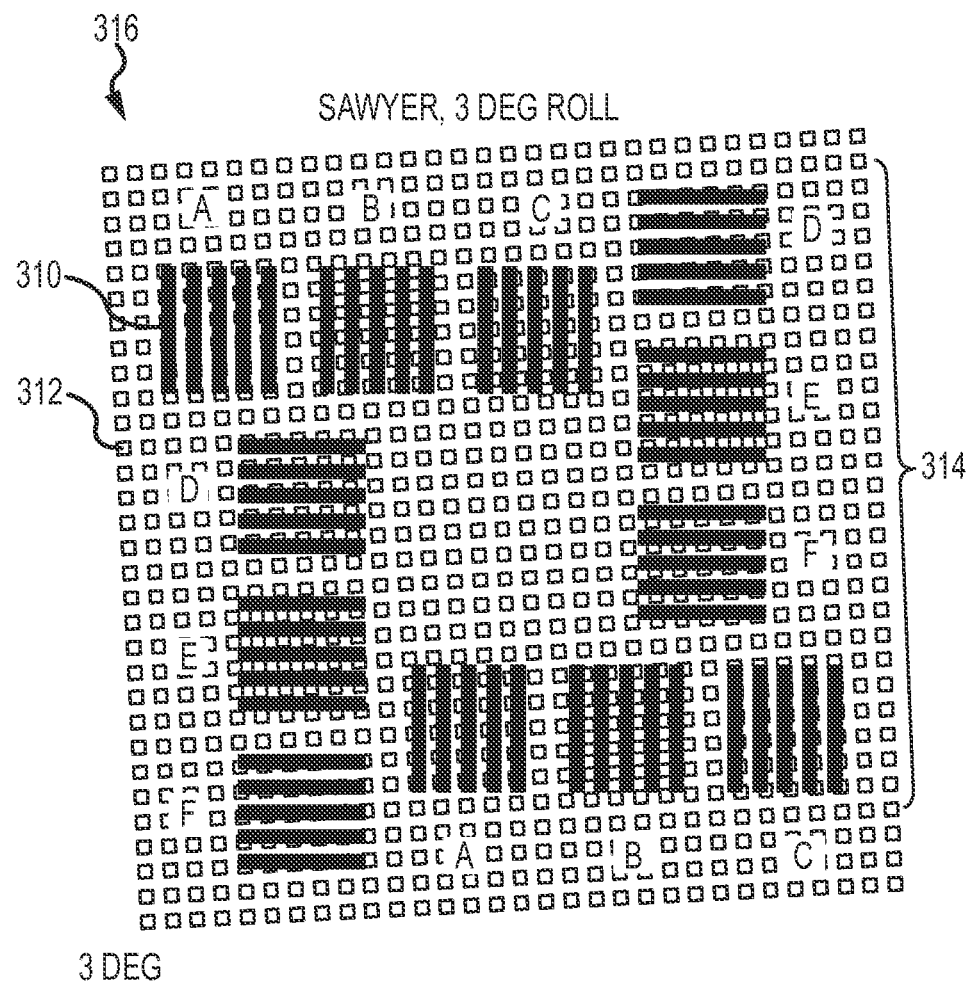
FIGS. 7a-7d are diagrams depicting limitations of the known planar motor as applied to a ball gimbal.
Figure 7B:
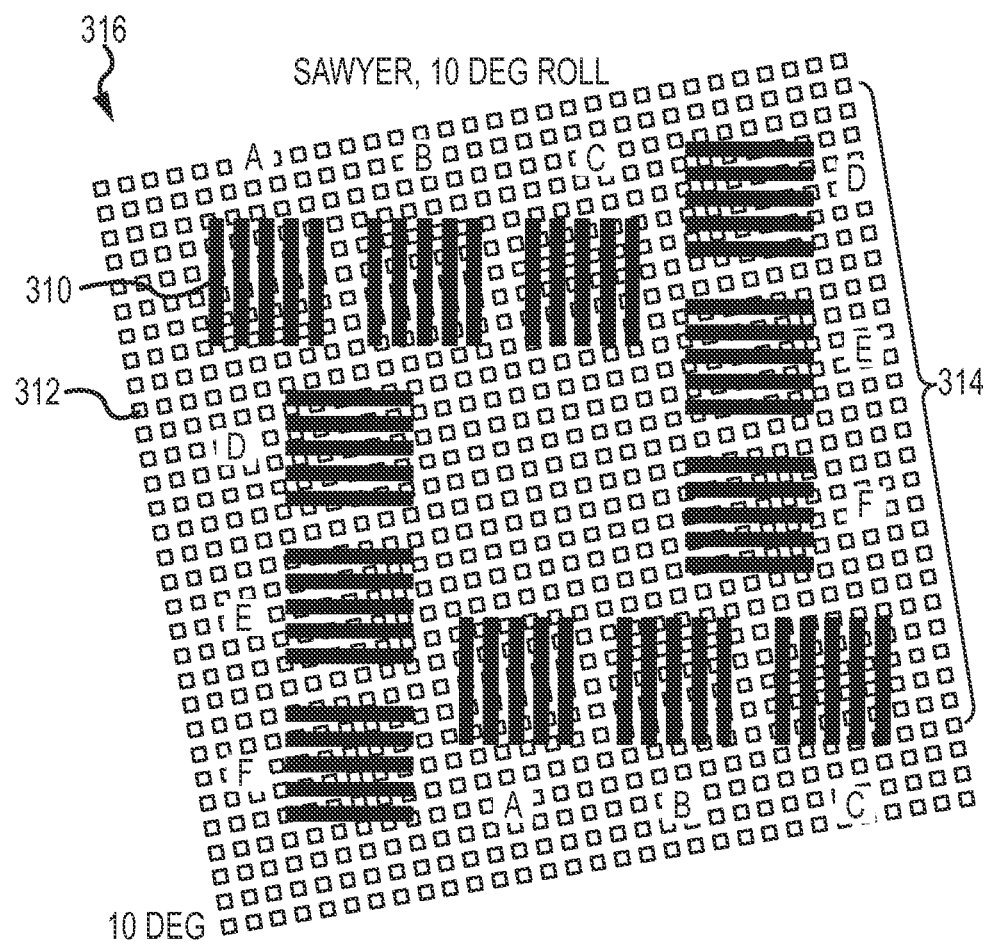
Figure 7C:
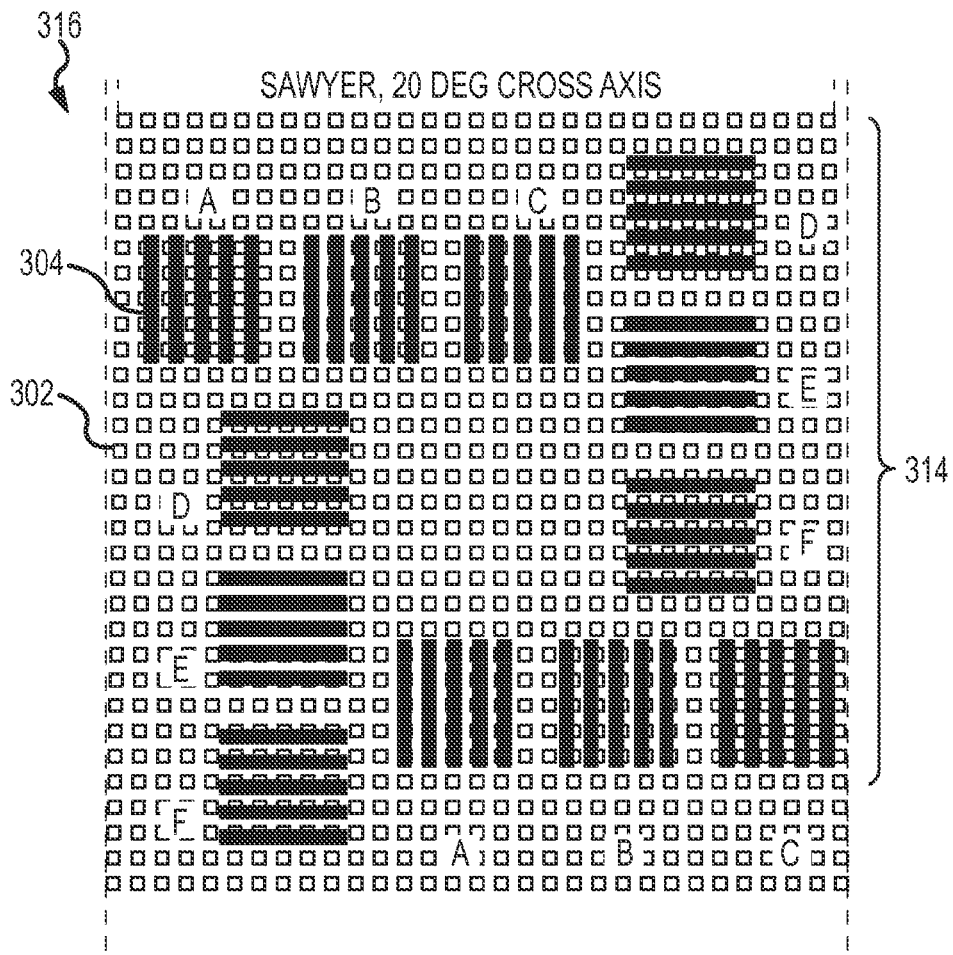
Figure 7D:
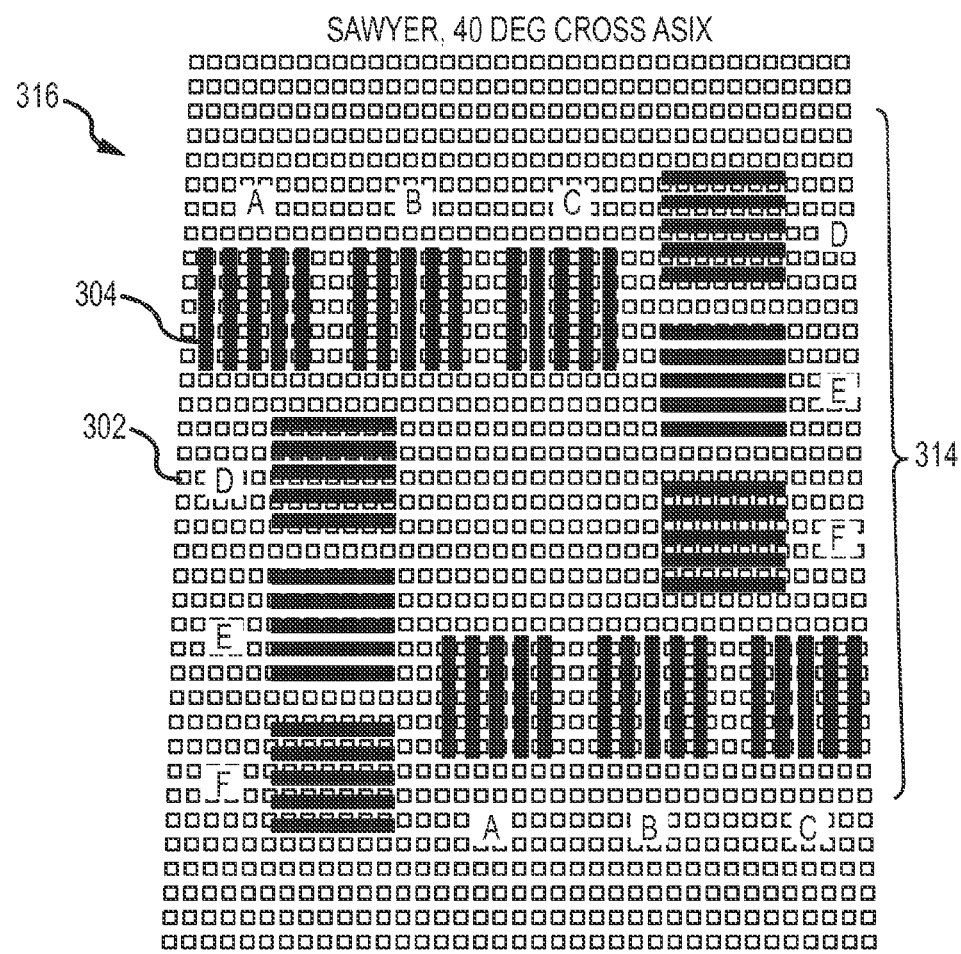
Figure 8B:
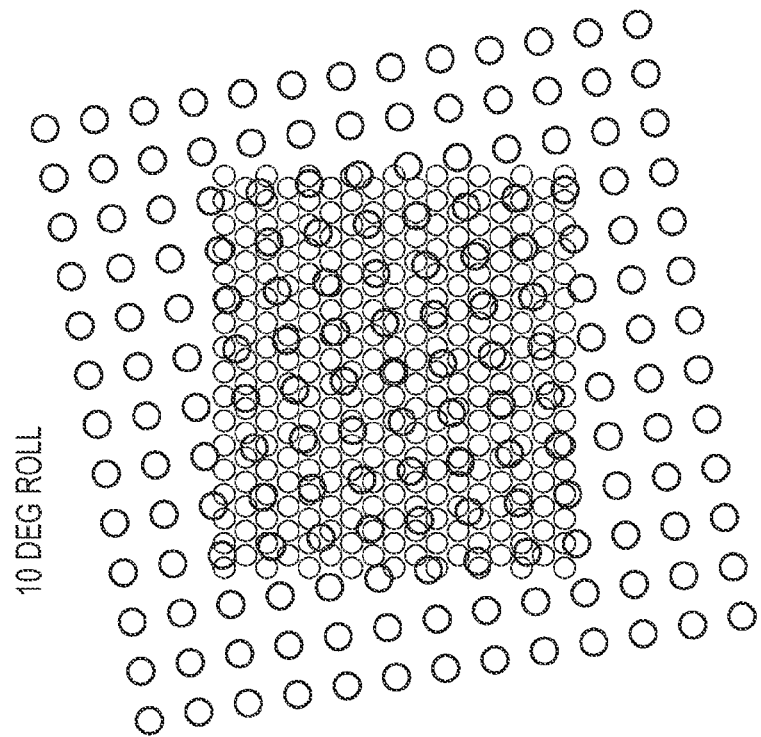
FIGS. 8a-8c are diagrams depicting an embodiment of a modified spherical planar motor.

Spherical planar motor 260 comprises one or more rotor elements 262 formed in (meaning "in" or "on") the surface of the inner ball. Each rotor element comprises a two-dimensional pattern of rotor teeth 264. The teeth may be magnetic alloy or permanent magnets of nominally alternating polarity (strict alternation is not consistent with maintaining reasonably uniform spacing of elements over a large part of the surface of a sphere). At least two two-dimensional drive elements 266 are positioned adjacent to control points on different diameters of the inner ball. Each drive element comprises a two-dimensional array of controllable drive heads 268 arranged substantially parallel to, but non-contacting, the adjacent portion of the inner ball and the two-dimensional pattern of rotor teeth. These heads are configured to change the magnetic field pattern to apply force in a desired direction to the adjacent teeth as these teeth move in phase (i.e., in fractions of a tooth). This is in marked contrast to a conventional Sawyer motor which changes the drive phase by switching to coils adjacent to a different area of teeth, relying on uniform spacing between teeth to preserve relative phase (which cannot generally be guaranteed on the surface of a sphere). For example, a Sawyer motor relies on a ⅓ tooth phase spacing between heads A,B, and C (FIG. 7a). While this assumption is true for the uniform tooth grid, it fails when the grid is placed on a sphere (FIG. 7d). The modified head of FIG. 8 has independent heads in two dimensions, so that forces may be balanced about each tooth to create the desired phase.

Wrapping the two-dimensional pattern of rotor teeth onto the spherical surface of the inner ball produces a non-uniform pattern of those rotor teeth, it cannot be avoided for any useful range of motion greater than a 20 degrees (depending upon the tooth pitch). Consequently, the orientation of the drive heads relative to the rotor teeth is a function of the rotational position of the inner ball. It follows that the energization of the particular drive heads to produce a commanded two-dimensional force is also a function of the rotational position of the inner ball. The pattern of energization of the drive heads in a drive element to produce the same commanded two-dimensional force will change with the rotational position of the inner ball.

An electronic controller 270 is configured to determine from a pointing command and the rotational position of the ball the energization of the drive heads 268 within each drive element that act upon the adjacent rotor teeth 264 to produce commanded two-dimensional forces in planes tangent to the inner ball substantially at the at least two control points to rotate the inner ball within the socket to point the pointing axis. The controller is configured to apply the determined energization to the drive heads. The electronic controller 270 may include a variety of electronics including but not limited to computer processors, memory and controlled current sources.

As previously mentioned, in applications such as aircraft, missiles, surveillance it is important that the inner ball have an extended range of motion in at least two axes to control the pointing axis to slew the EO element's field of view (FOV) over a large field of regard (FOR), and may require continuous 360 degrees of roll control. Different configurations of the two or more two-dimensional drive elements 280 and one or more rotor elements 282 for small and large motion FOR are illustrated in FIGS. 5a and 5b, respectively.

In general, at least two drive elements 280 must be positioned over toothed areas of the sphere at all valid rotational positions of the inner ball in the FOR. The desired FOR will define the extent of the one or more rotor elements 282 required to ensure this condition over the FOR. The motor configuration is not limited to tying each drive element to a paired rotor element. In different configurations, as the inner ball rotates over the FOR the same rotor element may be pushed on my multiple drive elements or, equivalently, different drive elements can push on the same teeth when the ball is in different rotational positions. This allows for a much larger range of motion.

Figure 5B:
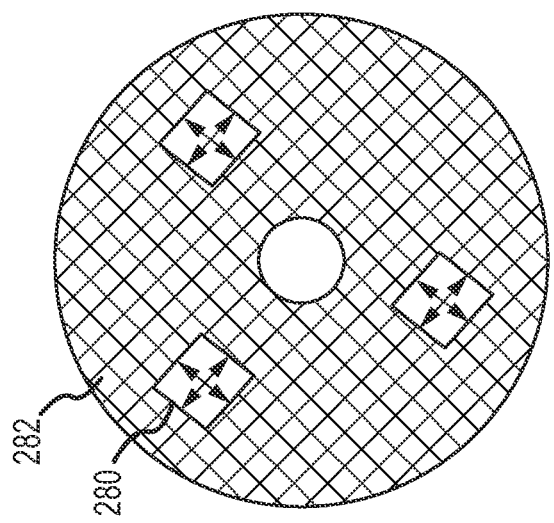
FIGS. 5a and 5b are different embodiments of the spherical planar motor.
Figure 5A:
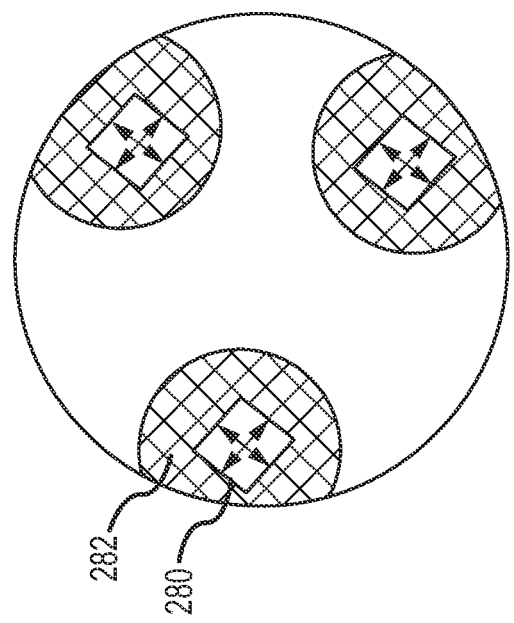

As shown in FIG. 5a, each of three drive elements 280 is nominally positioned over one of three rotor elements 282. In one configuration, the extents of the rotor elements 282 are defined such that over the allowed range of motion each drive element 280 remains positioned over the corresponding rotor element 282. More specifically, the angular extent of each rotor element is substantially less than the angular spacing between control points. The amount of motion and FOR is thus limited by the extents of the rotor elements to be less than the spacing between control points (with some margin for the width of the drive element). In another configuration, the extents of the rotor element 282 or elements are defined such that as the inner ball rotates at least two drive elements 280 remain over rotor elements 282 but the third rotor element may rotate to an uncovered position. As the inner ball continues to rotate, the third rotor element may again find a covered position over the same or a different rotor element 282. A different one of the drive elements may rotate to an uncovered position and so forth as long as at least two of the drive elements are covered. Such a configuration may allow for a much larger FOR, greater than the angular spacing between control points, than would be provided by the extents of each rotor element if the drive elements were required to remain paired with a particular rotor element. In general, if the motor includes N drive elements such that the angular spacing between control points is less than the angular extent of the rotor elements, the inner ball should be able to freely rotate over a large FOR as the drive elements move from one rotor element to the next.

As shown in FIG. 5b, a single rotor element 280 is configured to cover a large extent of the inner ball. The three drive elements 282 are positioned adjacent and over different teeth in the shared global tooth pattern such that the angular spacing of the between control points is less than the angular extent of the rotor element. As such, the inner ball can rotate over a large FOR.

Certain planar motor designs are based on a two-axis stepper motor. Such a planar motor is described in U.S. Pat. No. 3,376,578 (Sawyer, 1967), commonly referred to as a "Sawyer motor". FIGS. 6a through 6d shows a configuration of a planar motor 300 similar to Sawyer's figures, from a different view. The squares 302 are teeth of a fixed metal plate (the gaps between the teeth were filled with a non-magnetic substance to form a smooth surface). The bars 304 are electro-magnetic elements (e.g. active windings) rigidly attached to a movable head. These elements are controlled to move the head about the plane. As described by Sawyer, when the elements B and E are activated the head is held in the position shown in FIG. 6a, which represents an offset of ⅓ of the spacing between teeth. Changing to activating elements A and E then causes the head to move to the alignment shown in FIG. 6b, following which changing to activating elements C and E causes the head to move to the position shown in FIG. 6c. Clearly, the same principle applies in the cross axis, so that changing to activating elements F (rather than E) causes the head to move to the position shown in FIG. 6d. As described by Sawyer, open-loop alternating the magnetic drive causes the head to move freely in two axes.

Also, as observed by Sawyer, the symmetric placements of the magnets about the heads causes any torques due to momentary misalignments within the plane to cancel, so that the head stays in the same rotational alignment (rotation in the plane of the teeth) as it moves. For example, if the head were rotated as in FIG. 7a, activating any of the magnets would force the head back to the alignment of the grid.

Sawyer observed that a different method of controlling the electro-magnetic elements could double the effective resolution of the steps. Later developments (U.S. Pat. No. 3,445,741, Gerber), control the electromagnetic elements to provide still finer resolution, independent of the spacing between coils (or the tooth size). Applying such techniques to the 2D Sawyer motor is straightforward, and produces much finer control.

In the present invention, one could replace the fixed toothed-plane of Sawyer with a rotating toothed ball (rotor element), and the movable head with multiple fixed two-axis drive elements each comprising two-dimensional arrays of electromagnetic drive heads (so that the combination of drive heads may rotate the ball in all axes). Essentially each pair of a two-axis drive element and the rotor element would form a local Sawyer motor. But, this alone would not be sufficient. Wrapping the two-dimensional tooth pattern onto the spherical ball introduces problems that must be addressed.

Consider two motors (each a modified Sawyer motor), #1 mounted nominal at the yaw axis and #2 at the pitch axis of the ball. Each block e.g. A, B, C, D, E, and F, is a drive head 310 in that it operates against teeth 312 at a particular sub-tooth phase. The six drive heads define a two-axis drive element 314 with (A, B, C) driving one axis and (D,E,F) driving a second orthogonal axis. The two-axis drive element 314 and 312 define a motor 316. FIGS. 7a-7c depict one of the two motors.

Activating motor #1 moves the ball 3 degrees in pitch (the ball rotates orthogonal to, not along, the axis of a planar driver). This creates the problem shown in FIG. 7a for motor #2 316 on the orthogonal axis. The teeth 312 rotate in the plane of the drive element 314.

As discussed earlier, this would cause motor #2 to exert a contrary force, trying to undo the action of motor #1, although operating on a shorter lever arm. Also, as can be seen from the figure, efficiency is lost in the planar drive due to misalignment. For small angles, this might be managed. But, as shown in FIG. 7b, for larger cross axis rotations, the integrity of the driver configuration (aligning coils to teeth) is lost. In short, the two-axis planar configuration does not translate directly into two-axis spherical rotation.

And, there are problems even without considering the cross axis. FIG. 7c shows how the pattern of teeth 312 compresses when rotating away from the circumference of the sphere (the teeth get closer together near the poles). This figure shows teeth on 1 degree spacing, after the ball is rotated 20 deg. As for the case of small cross-axis rotation, the control method might be adapted to allow for compression due to small in-axis rotations. But, for larger rotations (40 degrees, shown in FIG. 7d), it is clear that the coils and teeth can no longer retain the necessary alignment.

The more general problem is that regular tessellations of a sphere are limited to a small number of vertex points. Hence, there is no regular mesh of teeth that can be applied uniformly about the surface of a sphere. And, even if there were, individual drive heads would still need to be able to deal with planar rotation of the tooth pattern. This implies that the pattern of teeth about the ball will necessarily be irregular, and that the drive heads must provide sufficient controllability to adapt to the local pattern. Sawyer's configuration does not provide this flexibility.

Figure 8A:
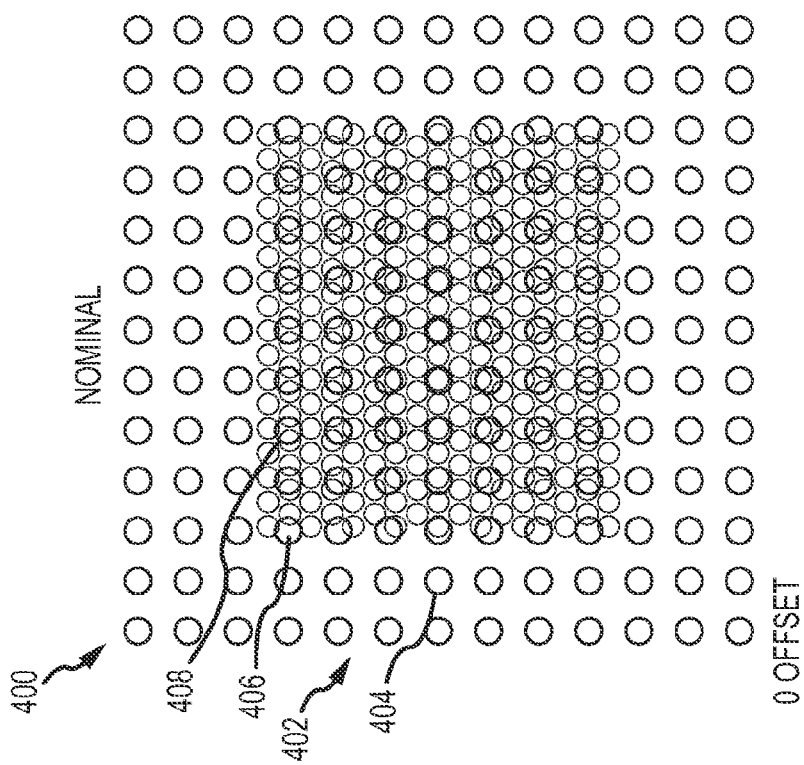
Figure 8C:

An embodiment of a spherical planar DC motor 400 is illustrated in FIGS. 8a-8d. This motor is based on Sawyer's planar motor configuration but as adapted to drive a spherical inner ball of a ball gimbal As shown in FIG. 8a, motor 400 includes a rotor element 402 having a two-dimensional pattern of rotor teeth 404. Sawyer's square teeth may be suitably replaced with circular teeth to improve the packing of teeth onto the spherical surface of the inner ball and the overall uniformity of the teeth. Each drive element 406 includes a two-dimensional array of individually controlled electro-magnetic drive heads 408. In order to produce, forces on the teeth in arbitrary and controllable directions within a plane, the center-to-center spacing between drive heads 408 is on the order of or less than the center-to-center spacing between teeth 404. As shown here, the spacing between driver head is less than ½ the minimum spacing between rotor teeth.

While it may appear that this control may be determined open-loop, as in the Sawyer motor, this quickly breaks down with cross axis rotation (FIG. 8b) and extended same axis rotation (FIG. 8c) as before. However, even under these conditions, the drive head placement and spacing provides sufficient flexibility to apply torque in any desired direction in the plane.

Figure 9:
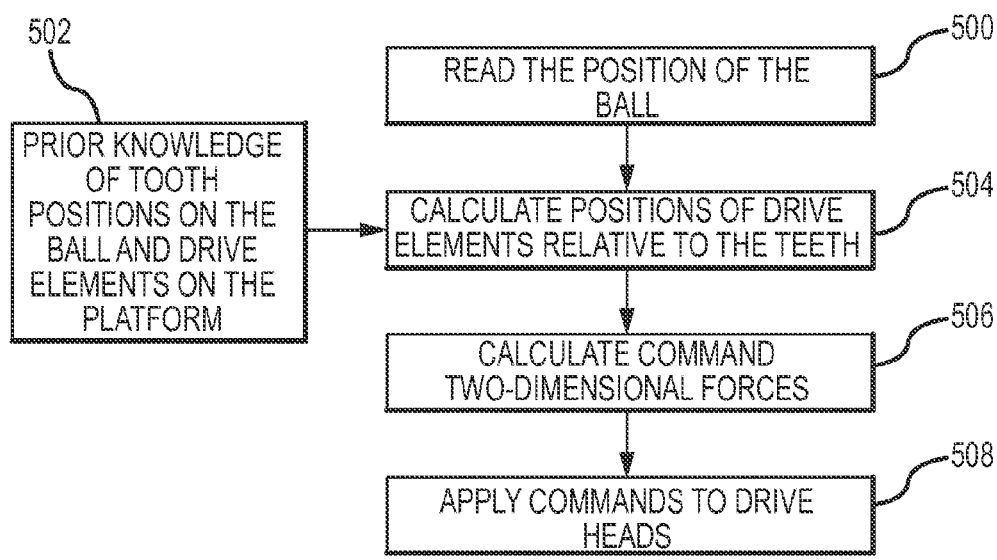
FIG. 9 is a flow diagram of an embodiment for control of the modified spherical planar motor.

An example of a process flow to accomplish this is shown in FIG. 9. First, read the 3-axis orientation of the ball relative to the platform (step 500), as described previously. Using knowledge of the tooth positions on the ball and of the drive elements on the platform (step 502), calculate the positions of the drive elements relative to the teeth on the ball (step 504). From this, calculate the commanded two-dimensional forces to apply to the drive elements to move those teeth in the desired direction (step 506). Then, apply those commands to the drive heads (step 508).

The more flexible drive head configuration and closed-loop control method described here is fundamentally enabling for adapting a two-axis planar motor to a sphere, as in the present invention. Still larger ranges of motion, where compression of points toward the axis becomes even more severe, can be handled using an irregular tooth pattern. As long as a maximum center-to-center spacing between adjacent teeth is maintained, the same method may be used.

In a conventional stepper motor, a fixed command to the drive heads causes the rotor to be stable (not wanting to turn) when it reaches a specific phase (fractional tooth) alignment of the rotor teeth relative to the drive heads. Changing the phase increment between commands by a small amount (a fraction of a tooth in phase) applies a force, moving the ball to the next position, and then holds it there. Applying different commands in phase sequence causes the rotor to move progressively in a linear direction. Because the tooth and drive head pattern is regular, the desired commands repeat for each full-tooth of motion. The same is true of a conventional planar motor, a la Sawyer, separately in each axis. In these simple, regular cases, the sequence of commands to move in a particular direction may be calculated open-loop.

In the preferred embodiment of the spherical planar motor, where the rotor has discrete teeth, the relationship of head commands to motion is more complicated. This is because the tooth pattern is necessarily irregular across a sphere (for non-trivial cases); tooth positions relative to the drive heads change not only with the relative phase of the ball rotation (fractional tooth rotation), but also with the absolute position (full tooth increments). Hence, the head drive command that will hold the ball stable at the next phase increment also changes vs. ball position. As a consequence, knowledge of absolute ball position is necessary to control the drive heads. By taking this into account as disclosed here, one may still calculate a series of head commands to move the rotor incrementally in the desired direction, as with other stepper motors.

Also, as with stepper motors, it is often desirable to consider not just the stable position for a given command, but the force (magnitude and 2-D direction, for the locally planar motor) produced when that command is applied (determined by the rotor position at that time). By updating the commands at a sufficiently high rate, a desired force can be maintained as the ball moves, causing the motor to act like a torquer, or force-commanded device, rather than ratcheting from one stable position to the next.

In either case, commands produce forces that cause the ball to rotate. The attached claims, in referring to forces, are be interpreted as covering either of these methods of control, and reasonable variants known to those of normal skill in the art.

As with stepper motors, when the command update rate is too low, the motion is jerky, as the ball moves from one stable position to another. With sufficiently fast command updates and feedback on ball position, the motion may be made smooth, allowing the planar motor to act as a torquer. As with a stepper motor, the commands may be updated at a sufficiently high rate that the motion is effectively continuous, with commands leading the position of the moving ball. If the rotor moves a fraction of a tooth between drive commands, the commands may be adjusted to provide effectively smooth and continuous motion While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A ball gimbal electro-optic system, comprising:
   a platform;
   a ball gimbal mounted on the platform, said ball gimbal including a socket fixedly mounted on the platform and an inner ball captured within the socket and free to rotate about combinations of three orthogonal axes to point a pointing axis;
   a directional electro-optic element mounted within the inner ball to transmit or receive an optical beam along the pointing axis; and
   a spherical planar motor comprising a plurality of two-dimensional drive elements configured to apply non-contacting electro-magnetic forces in planes tangential to the inner ball at at least two control points on different diameters of the inner ball in commanded two-dimensional directions to rotate the inner ball within the socket to point the pointing axis,
   wherein said spherical planar motor comprises:

one or more rotor elements formed in the surface of the inner ball, each said rotor element comprising a two-dimensional pattern of rotor teeth;

at least two of said two-dimensional drive elements positioned adjacent to the control points on different diameters of the inner ball, each said drive element comprising a two-dimensional array of controllable drive heads arranged substantially parallel to, but non-contacting, the adjacent portion of the inner ball and the two-dimensional pattern of rotor teeth;

a position measurement device configured to determine the rotational position of the inner ball, hence the placement of the rotor teeth relative to the drive heads;

a processor configured to determine from a pointing command and the rotational position of the ball the energization of the drive heads within each drive element that act upon the adjacent rotor teeth to produce commanded two-dimensional forces in planes tangent to the inner ball substantially at the at least two control points to rotate the inner ball within the socket to point the pointing axis; and a controller configured to apply the determined energization to the drive heads.

2. The ball gimbal electro-optic system of claim 1, wherein said rotor teeth are formed of a magnetic material or a permanent magnet.

3. The ball gimbal electro-optic system of claim 1, wherein said rotor teeth comprise permanent magnets arranged in said pattern with substantially alternating polarity.

4. The ball gimbal electro-optic system of claim 1, wherein the center-to-center spacing of the drive heads in each drive element is less than the center-to-center spacing of the rotor teeth.

5. The ball gimbal electro-optic system of claim 1, wherein the center-to-center spacing of the drive heads in each drive element is less than one-half the center-to-center spacing of the rotor teeth.

6. The ball gimbal electro-optic system of claim 1, wherein the rotor teeth are circular.

7. The ball gimbal electro-optic system of claim 1, wherein an angular extent of the rotor element is greater than an angular extent between two of the control points.

8. The ball gimbal electro-optic system of claim 1, further comprising:
a non-contacting position measurement device configured to determine the rotational position of the inner ball.

9. The ball gimbal electro-optic system of claim 8, wherein the EO component comprises a detector, said system further comprising:
a non-contacting data path from the detector on the inner ball to a receiver on the platform.

10. The ball gimbal electro-optic system of claim 1, further comprising:
optical elements on ball configured to produce small displacements of the optical line of sight, whereby providing Vernier stabilization against jitter in control of the pointing axis.

11. A ball gimbal electro-optic system, comprising:
a platform;
a ball gimbal mounted on the platform, said ball gimbal including a socket fixedly mounted on the platform and an inner ball captured within the socket and free to rotate about combinations of three orthogonal axes to point a pointing axis;

a directional electro-optic element mounted within the inner ball to transmit or receive an optical beam along the pointing axis;

a spherical planar motor comprising,
one or more rotor elements formed in the surface of the inner ball, each said rotor element comprising a two-dimensional pattern of rotor teeth;

at least two two-dimensional drive elements positioned adjacent to control points on different diameters of the inner ball, each said drive element comprising a two-dimensional array of controllable drive heads arranged substantially parallel to, but non-contacting, the adjacent portion of the inner ball and the two-dimensional pattern of rotor teeth;

a position measurement device configured to determine the rotational position of the inner ball, hence the placement of the rotor teeth relative to the drive heads;

a processor configured to determine from a pointing command and the rotational position of the ball the energization of the drive heads within each drive element that act upon the adjacent rotor teeth to produce commanded two-dimensional forces in planes tangent to the inner ball substantially at the at least two control points to rotate the inner ball within the socket to point the pointing axis; and a controller configured to apply the determined energization to the drive heads.

12. The ball gimbal electro-optic system of claim 11, wherein the center-to-center spacing of the drive heads in each drive element is less than the center-to-center spacing of the rotor teeth.

13. The ball gimbal electro-optic system of claim 11, wherein the center-to-center spacing of the drive heads in each drive element is less than one-half the center-to-center spacing of the rotor teeth.

14. The ball gimbal electro-optic system of claim 11, wherein the rotor teeth are circular.

15. The ball gimbal electro-optic system of claim 11, wherein an angular extent of the rotor element is greater than an angular extent between two of the control points.

16. A ball gimbal electro-optic system, comprising:
a platform;
a ball gimbal mounted on the platform, said ball gimbal including a socket fixedly mounted on the platform and an inner ball captured within the socket and free to rotate about combinations of three orthogonal axes to point a pointing axis;

a directional electro-optic detector mounted within the inner ball to receive an optical beam along the pointing axis;

a spherical planar motor comprising,
one or more rotor elements formed in the surface of the inner ball, each said rotor element comprising a two-dimensional pattern of rotor teeth having a center-to-center spacing;

at least two two-dimensional drive elements positioned adjacent to control points on different diameters of the inner ball, each said drive element comprising a two-dimensional array of controllable drive heads having a center-to-center spacing and arranged substantially parallel to, but non-contacting, the adjacent portion of the inner ball and the two-dimensional pattern of rotor teeth, wherein the center-to-center spacing of the drive heads is less than the center-to-center spacing of the rotor teeth;

a position measurement device configured to determine the rotational position of the inner ball, hence the placement of the rotor teeth relative to the drive heads;

a processor configured to determine from a pointing command and the rotational position of the ball the energization of the drive heads within each drive element that act upon the adjacent rotor teeth to produce commanded two-dimensional forces in planes tangent to the inner ball substantially at the at least two control points to rotate the inner ball within the socket to point the pointing axis; and a controller configured to apply the determined energization to the drive heads;

a power source configured to power the direction EO element on the inner ball;

a non-contacting position measurement device configured to determine the rotational position of the inner ball; and a non-contacting data path from the detector on the inner ball to a receiver on the platform.

\* \* \* \* \*